(No Model.)

G. B. GODDARD.
HANDLE FOR BICYCLE STEERING BARS.

No. 497,519. Patented May 16, 1893.

Witnesses.
George Perry
James T. Murray

Inventor.
Geo. B. Goddard
by N. C. Lombard
Attorney.

UNITED STATES PATENT OFFICE.

GEORGE B. GODDARD, OF BROCKTON, MASSACHUSETTS.

HANDLE FOR BICYCLE STEERING-BARS.

SPECIFICATION forming part of Letters Patent No. 497,519, dated May 16, 1893.

Application filed September 15, 1892. Serial No. 446,034. (No model.)

*To all whom it may concern:*

Be it known that I, GEORGE B. GODDARD, of Brockton, in the county of Plymouth and State of Massachusetts, have invented a new and useful Handle for Bicycle Steering-Bars, of which the following, taken in connection with the accompanying drawings, is a specification.

My invention relates to handles for bicycle steering bars and it consists in certain novel features of construction, arrangement and combination of parts which will be readily understood by reference to the description of the drawings and to the claims hereinafter contained and in which my invention is clearly pointed out.

Figure 1:
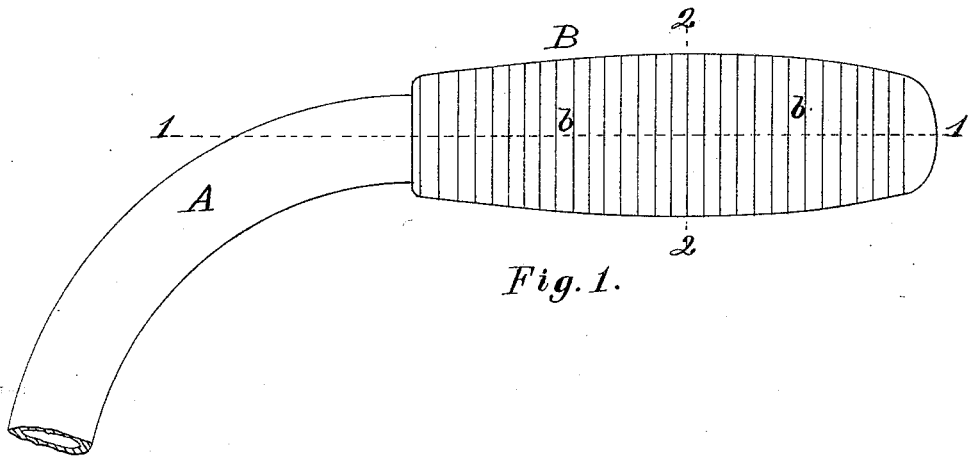
Figure 2:
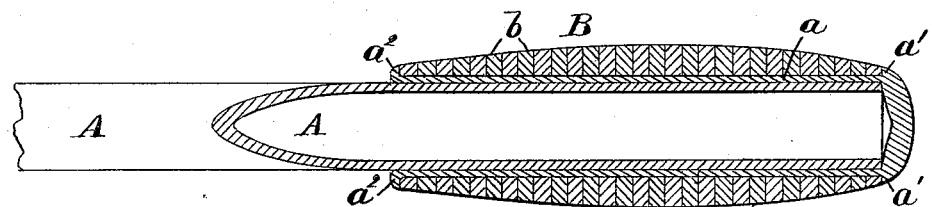
Figure 4:
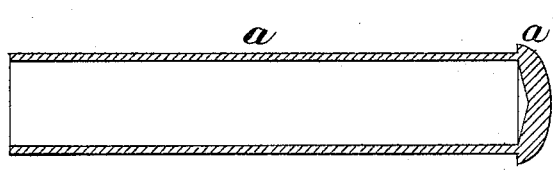
Figure 3:
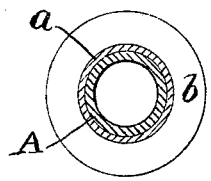

Figure 1 of the drawings is a plan of a portion of one arm of a bicycle steering bar or lever with my invention applied thereto. Fig. 2 is a section on line 1 1 on Fig. 1. Fig. 3 is a transverse section on line 2, 2, on Fig. 1, and Fig. 4 is a central longitudinal section of the metallic sleeve of the handle before the non-metallic sleeve is applied thereto.

In the drawings A is a portion of a bicycle steering bar preferably made in the form of a tube and B is the handle composed of the metallic sleeve $a$ having the fixed and integral head $a'$ on one end, and an integral head $a^2$ at its other end, formed by expanding the end of the tube in the same manner that boiler tubes are expanded in setting the same, and a sleeve of some non-metallic substance preferably in the form of a series of rings of leather $b$ firmly compressed between said heads $a'$ and $a^2$ by the operation of expanding the end of the sleeve to form the head $a^2$. The handle B is attached to the bar A by a driving fit and requires no other fastening.

In another application of mine of even date herewith, Serial No. 446,033, I have shown and described a handle having many features in common with the subject matter of this application, in which the non metallic sleeve or leather rings were clamped by means of a nut. In the present case I dispense with the nut, and the thread on the tubular bolt or metallic sleeve, and expand the end of said sleeve to form the second head and clamp the non-metallic sleeve or leather rings as hereinbefore described, and by so doing I make a very durable and serviceable handle, not liable to be easily injured and that can be produced at a moderate cost, and that may be applied to a variety of tools or implements by simply adapting the bore of the metallic sleeve to the tool or implement to which it is to be applied.

I claim—

1. A handle for bicycle steering bars or other purposes composed of a metallic sleeve or tube having a fixed and integral head at one end, and a head or collar at its other end formed by turning the end of the sleeve or tube outward at right angles to its main body; and a sleeve of non-metallic material preferably leather firmly clamped between said two heads, as set forth.

2. A handle for bicycles and other purposes composed of a metallic sleeve or tube provided with an integral head or collar projecting at right angles therefrom at each end, and a sleeve of non-metallic material made of a series of rings firmly clamped between said heads, as set forth.

In testimony whereof I have signed my name to this specification, in the presence of two subscribing witnesses, on this 6th day of September, A. D. 1892.

GEORGE B. GODDARD.

Witnesses:
N. C. LOMBARD,
GEORGE PERRY.